United States Patent
Hayward et al.

(10) Patent No.: US 6,891,633 B1
(45) Date of Patent: May 10, 2005

(54) IMAGE TRANSFER SYSTEM

(75) Inventors: Ken Hayward, Brockport, NY (US); Marc J. Krolczyk, Rochester, NY (US); Dawn M. Marchionda, Marion, NY (US); Thomas L. Wolf, Webster, NY (US); James S. Laird, Penfield, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/364,959

(22) Filed: Jul. 30, 1999

(51) Int. Cl.[7] .......................... G06F 13/00; G06F 3/00; H04N 13/00
(52) U.S. Cl. ...................... 358/1.15; 358/442; 715/825
(58) Field of Search .................. 358/1.15, 442, 358/1.1, 1.17, 468, 444, 400; 379/100.01; 345/902; 715/825, 845

(56) References Cited

U.S. PATENT DOCUMENTS

| | | | |
|---|---|---|---|
| 4,870,357 A | * 9/1989 | Young et al. ............... | 324/158 |
| 5,021,892 A | * 6/1991 | Kita et al. .................. | 358/468 |
| 5,048,078 A | * 9/1991 | Satomi et al. .............. | 379/100 |
| 5,084,875 A |   1/1992 | Weinberger et al. ........ | 371/291 |
| 5,270,821 A | * 12/1993 | Samuels ..................... | 358/188 |
| 5,412,779 A | * 5/1995 | Motoyama .................. | 395/275 |
| 5,499,108 A | * 3/1996 | Cotte ......................... | 358/400 |
| 5,550,649 A | * 8/1996 | Wong et al. ................ | 358/479 |
| 5,592,307 A | * 1/1997 | Murai ......................... | 358/468 |
| 5,608,546 A | * 3/1997 | Nakamura et al. .......... | 358/468 |
| 5,619,684 A | * 4/1997 | Goodwin et al. ............ | 710/62 |
| 5,798,738 A |   8/1998 | Yamada ...................... | 345/2 |
| 5,835,236 A | * 11/1998 | Barbari ...................... | 358/442 |
| 5,845,057 A | * 12/1998 | Takeda et al. .............. | 395/114 |
| 5,905,866 A | * 5/1999 | Nakabayashi et al. ....... | 709/223 |
| 5,914,713 A | * 6/1999 | Nario et al. ................ | 345/744 |
| 5,933,478 A | * 8/1999 | Ozaki et al. ............... | 379/93.24 |
| 5,935,217 A | * 8/1999 | Sakai et al. ................ | 709/249 |
| 5,946,457 A | * 8/1999 | Nakai et al. ................ | 395/112 |
| 6,063,030 A | * 5/2000 | Vara et al. .................. | 600/437 |
| 6,072,598 A | * 6/2000 | Tso ............................ | 358/442 |
| 6,091,409 A | * 7/2000 | Dickman et al. ........... | 345/847 |
| 6,154,214 A | * 11/2000 | Uyehara et al. ............ | 345/863 |
| 6,157,194 A | * 12/2000 | Vassallo et al. ............ | 324/322 |
| 6,219,709 B1 | * 4/2001 | Byford ....................... | 709/227 |
| 6,301,586 B1 | * 10/2001 | Yang et al. ................ | 707/104.1 |
| 6,332,153 B1 | * 12/2001 | Cohen ........................ | 709/204 |
| 6,373,507 B1 | * 4/2002 | Camara et al. ............ | 715/825 |
| 6,546,002 B1 | * 4/2003 | Kim ........................... | 370/351 |
| 6,590,590 B1 | * 7/2003 | Wen et al. .................. | 715/764 |
| 6,667,749 B2 | * 12/2003 | Sato ........................... | 715/762 |
| 6,741,262 B1 | * 5/2004 | Munson et al. ............ | 345/594 |

* cited by examiner

Primary Examiner—Madeleine Nguyen
(74) Attorney, Agent, or Firm—Perman & Green, LLP

(57) ABSTRACT

An electronic assembly comprising an image transfer device for reading and transferring an image from a first medium, and a computer. The image transfer device includes a reader for reading the image on the first medium, and a display for displaying an image transfer menu for affecting transfer of the image. The computer is removably connected to the image transfer device. When the image transfer device is not connected to the computer, the image transfer device has a first type of the image transfer menu available for display on the display of the device. When the image transfer device is connected to the computer, the transfer device has a second type of the image transfer menu available for display on the display of the device. The second type of menu includes enhanced features for operating the image transfer device which transparently use the computer processor and memory to effect an image transfer according to the enhanced features.

26 Claims, 8 Drawing Sheets

IMAGE TRANSFER SYSTEM

BACKGROUND OF THE INVENTION

1. Field of the Invention

The present invention relates to an image transfer system and, more particularly, to an image transfer system comprising a transfer device which can be operably connected to a computer.

2. Prior Art

There are examples in the prior art of image transfer systems comprising an image transfer device coupled to one or more computers. One such example is U.S. Pat. No. 5,798,738 which provides a copying machine print manager system which comprises a terminal connected to a copying machine. Generally, copying machines in the prior are capable of performing only a given set of functions regardless of whether the copying machine is connected to a computer or not.

One object of the present invention is to provide a software and user interface (UI) solution for enriching personal and desktop copier feature sets by utilizing the processing power and memory capacity of a connected personal computer. In accordance with this goal, the present invention addresses the software and UI enablers that allow a document to be scanned at the multifunction device; the device sending the data to the PC to perform enriched copier/printer capabilities such as collation. The PC performs the enriched task and sends the new instructions back to the multifunction device for output. Another object of the present invention provides for initiation of the job to take place at the device, so the user need not know the PC is involved in the process. This invention also addresses feature buttons embedded in an UI display on the device which are visible and operational when a PC is connected to the device, and the underlying software that would enable them.

SUMMARY OF THE INVENTION

In accordance with the first embodiment of the present invention, an electronic assembly is provided. The electronic assembly comprises an image transfer device for reading and transferring an image from a first medium, and a computer. The image transfer device includes a reader for reading the image on the first medium, and a display. The display displays an image transfer menu for effecting transfer of the image. The computer is removably connected to the image transfer device. When the image transfer device is not connected to the computer, the image transfer device has a first type of the image transfer menu available for display on the display of the device. When the image transfer device is connected to the computer, the transfer device has a second type of the image transfer menu available for display on the display of the device.

In accordance with a second embodiment of the present invention, a transfer apparatus is provided. The transfer apparatus has a reader for scanning information disposed on a first medium, and a controller connected to the reader. The transfer apparatus comprises a connector, and a display. The connector is connected to the controller for removably connecting a computer to the transfer apparatus. The display is connected to the controller for displaying menus comprising features for operating the transfer apparatus. The display displays a first one of the menus when the computer is not connected to the apparatus. The display displays a second one of the menus when the computer is connected to the apparatus. The second menu comprises extended features for operating the apparatus in comparison to the first menu.

In accordance with a first method of the present invention, a method for transferring information from a first medium is provided. The method comprises the steps of providing an image transfer device, reading the image on the first medium, sending the image from the transfer device to a computer, automatically manipulating the image, and automatically sending the manipulated image from the computer to the transfer device. The image transfer device has a scanner for reading an image on the first medium. The manipulated image is sent from the computer to the transfer device without user interaction with the computer. The manipulated image is transferred from the transfer device to a second medium.

In accordance with a second method of the present invention, a method for enhancing operating features of a transfer device is provided. The transfer device is adapted for transferring information from a first medium to a second medium. The method comprises the steps of providing a first command menu of the transfer device, connecting a computer to the transfer device, and with the computer enabling the device to display a second command menu. The first command menu represents a first set of the operating features of the transfer device. The first menu is available for display on a display of the device when the computer is not connected to the transfer device. When the computer is connected to the transfer device, the computer enables the device to display the second command menu. The second command menu represents a second set of the operating features of the transfer device. The second set of operating features has expanded operating features in comparison to the first set of operating features of the transfer device.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

Figure 1:
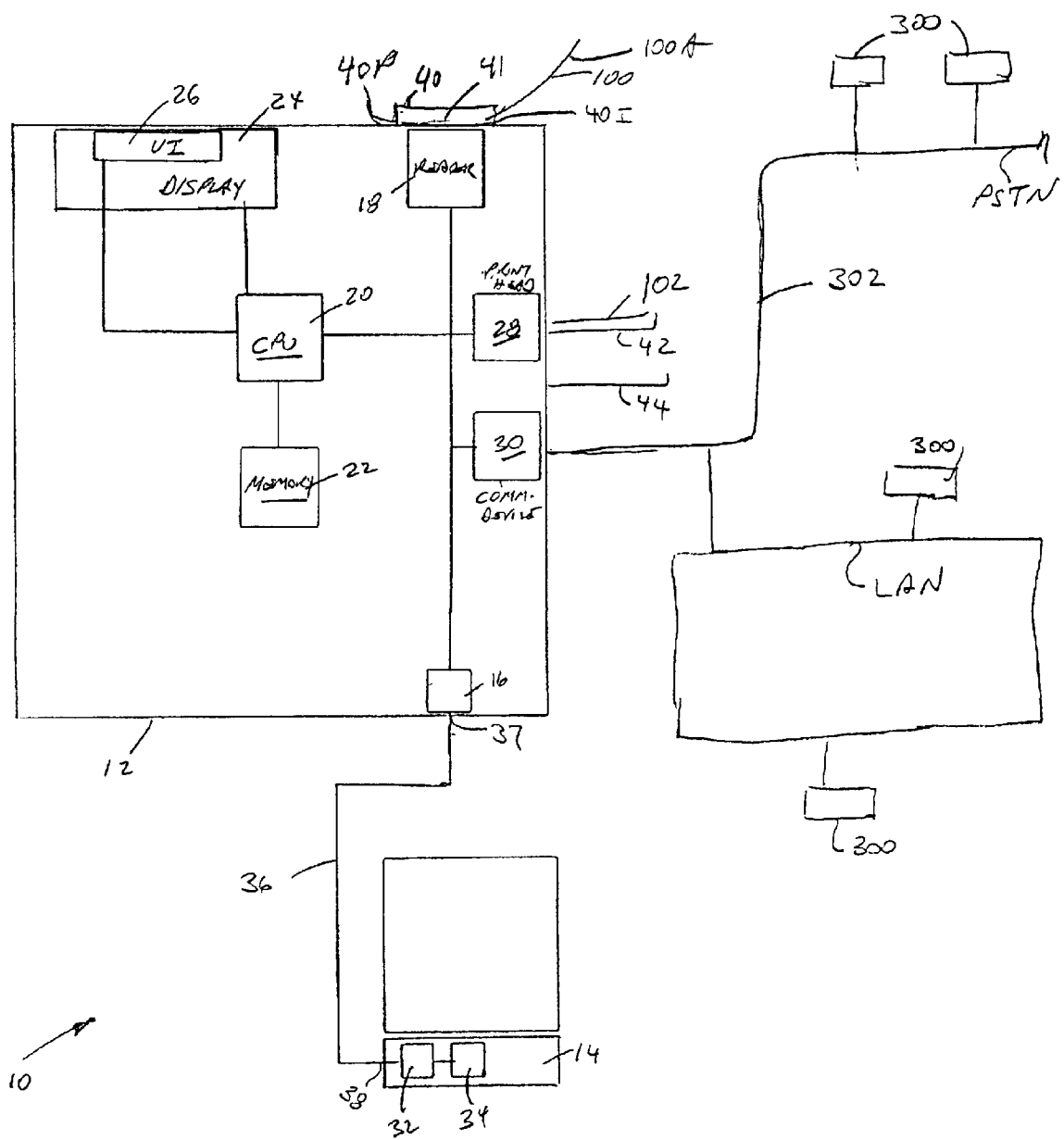
FIG. 1 is a schematic diagram of an image transfer system incorporating features of the present invention.

Referring to FIG. 1, there is shown a schematic diagram of an image transfer system 10 incorporating features of the present invention. Although the present invention will be described with reference to the single embodiment shown in the drawings, it should be understood that the present invention can be embodied in many alternate forms of embodiments. In addition, any suitable size, shape or type of elements or materials could be used.

Still referring to FIG. 1, the image transfer system 10 generally includes an image transfer device 12 and a computer 14. The computer 14 is connected to the image transfer device 12 by a cable 36 which is removably mated to a connector 16 of the device 12. The image transfer device 12 generally comprises a reader 18, a central processing unit (CPU) 20, a memory 22, a display 24 and a user interface (UI) 26. Preferably, the device 12 also includes a print head 28 and a communication device 30. The reader 18 is adapted to read a printed image on medium 100. The print head 28 is adapted to print an image on medium 102. The communication device 30 is adapted to transmit and receive images between the device 12 and one or more image transfer devices 300 located at remote locations. The reader 18, print head 28, and communication device 30 are connected so that the reader 18 can send information to both the print head 28 and the communication device 30. The communication device 30 can also send information to the print head 28. The CPU 20 is connected to the reader 18, the print head 28, and the communication device 30. The CPU 20 is capable of controlling the operation of the reader 18, the print head 28, and the communication device 30 in response to commands from a user. The user enters commands via the user interface 26 which is connected to the CPU 20. The user selects the commands from a menu displayed on the display 24 of the device 12. The CPU 20 of the image transfer device 12 is connected to the connector 16. The reader 18, print head 28, and communication device 30 are also connected to connector 16. The computer 14 generally includes a processor 32 and a memory 34. The computer 14 may be part of a local area network (not shown). When the computer 14 is connected via cable 36 to the connector 16, the CPU 20 can access the computer processor 32 and memory 34. Also, when the cable 36 is connected to the connector 16, the reader 18, the print head 28, and the communication device 30 are connected to the computer 14. This allows the reader 18 to send information to the computer 14, and allows the computer 14 to send information to the print head 28 and communication device 30 of the image transfer device 12. Thus, the image transfer device may include a computer printer, a copier, a facsimile or an optical scanner capability. In the preferred embodiment, the image transfer device 12 performs as a multi-function device which includes one or more of the aforementioned capabilities. In alternate embodiments the device may have more or less than these four capabilities. The multi-function device 12 of the present invention is capable of operating, at least partially, as a stand alone device when the computer 14 is not connected to the device 12; such as only a copier and/or only a facsimile machine. When the computer 14 is connected to the device 12, the device 12 may use the software and memory of the computer 14 to perform one or more of the enhanced or extended capabilities of the device 12 as will be described in greater detail below.

In particular, the reader 18 of the device 12 is preferably an optical scanner capable of reading an image or pattern embodying information which is disposed on sheet medium 100. In the preferred embodiment, the device 12 has an input area 40 in which the user places the sheet medium 100 for reading by the reader 18. The input area generally includes a cover 41 for covering a glass platen (not shown) upon which the user places the sheet medium 100 with the image face 100A down. The user may place the sheet medium 100 directly on the glass platen or may use a roller system (not shown) within the cover 41 to feed the sheet medium 100 to the glass platen from an input port 40I. The reader 18 is generally located below the glass platen of the input area 40. The reader 18 is orientated relative to the glass platen to scan the surface 100A of the sheet medium 100 placed against the glass platen. In the preferred embodiment, the reader 18 is a movable reader which operates to optically scan the surface 100A of the sheet medium 100 placed on the glass platen. For example, the reader 18 may travel along the length of the sheet medium 100 while scanning laterally across the face 100A of the sheet medium 100. In alternate embodiments, the device may have a static reader. In that case, a roller system may transport the sheet medium from the input area over the static reader in order for the reader to read the image on the sheet medium. After the reader 18 has finished reading the images on the sheet medium 100, the sheet medium can be removed manually or output by the roller system (not shown) to an output port 40P of the device 12. During operation, the reader 18 converts the printed image on the sheet medium 100 to binary encoded data which can be sent electronically, as directed by the CPU 20 to the print head 28, or the communication device 30.

The print head 28 is generally capable of receiving an image in the form of binary data and of printing the image on sheet medium 102. The device 12 has an input area 42 for placing sheet medium 102 prior to printing. An output area 44 holds the sheet medium 102 processed by the print head 28. A sheet medium transport system (not shown), such as a roller system for example, inside the device 12 withdraws sheet medium 102 from the input area 42 and transports the sheet medium 102 to the print head 28. The print head 24 prints the image on the sheet medium 102 and the transport system then moves the sheet medium 102 to the output area 44 of the device 12.

The communication device 30 is generally a facsimile transceiver or modem which is coupled to a communication line 302 connecting the device 12 to other image transfer devices 300. The communication line 302 may a land line such as for example a public switched telephone network (PSTN) or a local area network (LAN) line to which the other transfer devices 300 are connected. However, in alternate embodiments, the communication device may include the capability to communicate with the other image transfer devices over a cellular telephone network.

The communication device 30 is otherwise adapted to receive the binary data of the image read by the reader 18 and generate signals transmitting the image over the communication line 302 to one or more designated image transfer devices 300. The image transfer devices 300 which receive the signals may then reproduce the transmitted image. The communication device 30 can in turn receive images over the communication line 302 from the image transfer devices 300. The communication device 30 demodulates the signals forming the images and then may send the data as directed by the CPU 20 to the print head 28 for printing the images on sheet medium 102.

The connector 16 of the image transfer device 12 is preferably a universal bus connector. In alternate embodiments, the connector of the image transfer device may be a parallel port connector. The cable 36 for connecting the computer 14 to the device 12 has a connectorized end 37 adapted to be removably mated to the serial port connector 16. The opposite end 38 of the cable 36, which end is preferably also connectorized, is connected to a suitable input/output port (not shown) of the computer 14. When the computer 14 is connected via cable 36 to the device 12, image data can be sent from the reader 18 to the computer 14. In addition, when the computer 14 is connected to the device 12, data of an image formed with the computer 14 can be sent from the computer 14 to the print head 28 of the device 12. Furthermore, image data generated with the computer 14 may also be sent to the communication device 30 for transmission over communication line 302 to one or more of the image transfer devices 300. Conversely, image data generated by the communication device 28 of images received from one of the remote transfer devices 300, may be sent under the control of the CPU 20 from the communication device 30 to the computer 14.

The CPU 20 is programmed to control the operation of the reader 18, the print head 28 and the communication device 30. The CPU 20 controls the operational sequence of the reader 18, print head 28 and communication device 30 as well as the flow of data therebetween. For example, when the image transfer device 12 is operating in a copier mode, the CPU 20 energizes the reader 18 to read the image on surface 100A of the sheet medium 100. The CPU 20 directs the data from the reader 18 to the print head 28 and queues the print head to print the image read by the reader 18 on sheet medium 102. Concurrent with this, the CPU also operates the transport system transporting the sheet medium 102 from the input area 42 to the print head 28 and then to the output area 44 of the device. When the device 12 is operating in a facsimile sending mode, the CPU 20 operates the communication device 30 to make a connection with selected remote devices 300. The CPU 20 then energizes the reader 18 to read the image on the sheet medium 100 and directs the data to the communication device 30 which sends the data to the remote device 300. In the facsimile standby mode, the CPU 20 operates the communication device 30 to respond to a connection signal from a remote device 300 and form a connection. The CPU 20 may then direct the demodulated image signal received by the communication device 32 to the print head 28 and queue the print head for printing the image on sheet medium 102. The CPU 20 also controls operations of the device 12 when the computer 14 is connected to the device. For instance, when the device 12 is in a scanner mode, the CPU 20 energizes the reader 18 and sends the image data from the reader to the computer. When the device 12 is in a printer mode, the CPU 20 queues the print head for printing and directs image data from the computer 14 to the print head 28.

Figure 2:
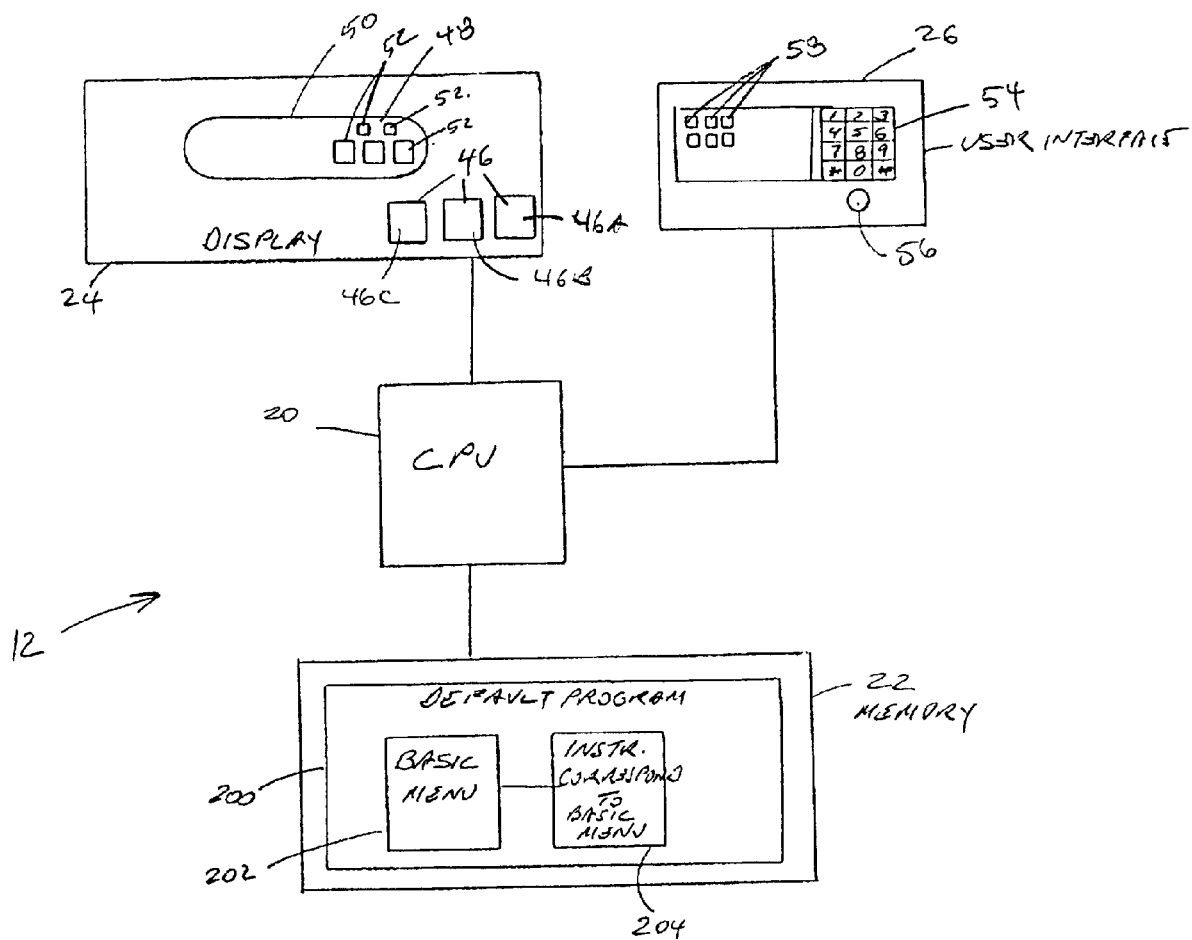
FIG. 2 is a schematic diagram showing a computer, and the display, user interface, processor, and memory of an image transfer device of the image transfer system shown in FIG. 1.

The user uses the display 24 and the user interface 26 to operate the image transfer device 12. Referring now also to FIG. 2, the display 24 of the image transfer device 12 is preferably a LCD though any other suitable type of display may be used. Operation of the display 24 is controlled by the CPU 20. The display 24 comprises display zones 46 in which the CPU 20 brings up operational and device status information on the display 24. For example, the CPU 20 is capable of counting the pages processed by the reader 18 and the print head 28 and may display the reader page count in zone 46A on the display and the print head page count in zone 46B of the display 24. The CPU 20, in accordance with its programming, may further activate LCD pixels of the display in order to present pre-programmed indicia in zone 46C which indicate to the user various housekeeping functions of the device 12. Such indicia may include for example, a symbol indicating that a paper jam has occurred, or a symbol indicating that maintenance should be performed on a portion of the device 12 such as the reader 18 or the print head 24. The CPU 20 may be programmed to control the LCD pixels of the display 24 to also display messages. The CPU 20 is further programmed to display an operating menu 48 on the display 24 of the transfer device 12. The operating menu comprises commands which designate functions of the device 12. In the preferred embodiment, the LCD display 24 of the device 12 incorporates an active or touch display 50. The CPU 20 displays the operating menu 48 of the device within the touch display 50. The operating menu 48 includes feature or command buttons 52 disposed on the touch display 50. The user may activate and deactivate, one or more of the command buttons 52 by touching the desired buttons 52 shown on the display 50. The user may also activate or deactivate the command buttons 52 of the operating menu by using the user interface 26 of the device 12. As shown in FIG. 2, the user interface 26 generally includes a numerical keypad 54, a track ball 56 and function keys 58 corresponding to the command buttons 52 of the menu on the touch display 50. The track ball 56 allows the user to move a pointer (not shown) which the CPU 20 displays on the display 50. The user may thus select one of the command buttons 52 by moving the pointer to the desired button and striking an enter or register key (not shown) on the user interface 26 which activates or deactivates the button 52. The user may also activate or deactivate a command button 52 by striking a predetermined key 58 on the user interface 26 which corresponds to the desired button 52. In alternate embodiments, the display of the device need not be a is touch display, in which case the command features of the operating menu shown on the display may be activated and deactivated by using the keys and track ball of the user interface. The CPU 20 senses activation or deactivation of the command buttons 52 and changes the display 50 to shown that the selected buttons 52 have been activated or deactivated as appropriate. Activation of the command buttons 52 of the operating menu shown on the display 50 sends the commands corresponding to the activated buttons to the CPU 20 which in turn proceeds to control the operation of the device in accordance with the received commands. Deactivation of the command buttons 52 deletes the corresponding operative commands from the CPU 20.

The software used by the CPU 20 is stored in the memory 22 of the device 12. In addition to storing the software used by the CPU 20, the memory 22 may also have memory space for storing data sent from the reader 18, the communication device 30, or the computer 14 when the computer is connected to the device 12. In general, the software stored in the memory 22 includes a default or basic program 200 for operating the image transfer device 12. The basic program is loaded in the CPU 20 when the CPU 20 is initialized and the computer 14 is not connected via cable 36 to connector 16 of the device 12. The basic program 200 has a module 202 which defines the basic operating menu available for display by the CPU 20 on the display 50 when the computer 14 is not connected to the device 12. The basic program 200 also includes a program module 204 which provides instructions to the CPU 20 for controlling the functions of the device 12 corresponding to the commands within the basic operating menu.

One example of the features of the basic operating menu available for display by the CPU 20 as defined by program module 202 are listed in Table 1 below.

TABLE 1

I. Mode

1. COPIER

II. ORIGINAL TYPE

| 1. AUTO* | 2. TEXT | 3. PHOTO | | |
|---|---|---|---|---|

III. MAINTENANCE

| 1. CLEAN PRINT HEAD | 2. PRINT TEST PAGE | 3. ALIGN PRINT HEAD | 4. RESET PRINTER | 5. INK LEVELS A. Black B. Cyan C. Magenta D. Yellow |
|---|---|---|---|---|

IV. PRINT DEMO

V. DEFAULTS

| 1. Feature Defaults A. Some new B. Reset | 2. Program Time-out A. 60 sec.* B. 90 sec. | 3. Sleep Mode A. 5 min* B. 10 min | 4. Paper Size A. Latter* B. AA | 5. Reset Factory |
|---|---|---|---|---|

VI. LANGUAGE

| Language 1 | Language 2 | Language 3 | Language 4 | Language 5 |
|---|---|---|---|---|

2. FACSMILE

II. ORIGINAL TYPE

| 1. AUTO* | 2.TEXT | 3. PHOTO | | |
|---|---|---|---|---|

III. TELEPHONE NUMBERS

| NO. 1 | NO. 2 | NO.3 | NO. 4 | NO. 5 |
|---|---|---|---|---|
| NO. 4 | NO. 5 | NO.6 | NO. 7 | NO. 8 |

V. DEFAULTS

| 1. Feature Defaults A. Some new B. Reset | 2. AUTO REDIAL A. 3 min* B. 5 min | 2. Program Time-out A. 60 sec.* B. 90 sec. | 3. Sleep Mode A. 5 min* B. 10 min | 4. Paper Size A. Latter* B. AA |
|---|---|---|---|---|

VI. LANGUAGE

| Language 1 | Language 2 | Language 3 | Language 4 | Language 5 |
|---|---|---|---|---|

*Default Settings

As can be seen from Table 1, in the preferred embodiment, the structure of the basic operating menu is generally organized based on selection categories. Each selection category further includes one or more selection command options. For example, the basic operating menu in the preferred embodiment has a Mode selection category which is labeled as selection category I in Table 1. The Mode selection category includes command options for: 1) "Copier", and 2) "Facsimile" modes which respectively allow the user to select the operating mode of the device 12 as either a copier or facsimile. In the "Copier" mode, the basic operating menu further includes: selection category II "Original Type"; selection category III "Maintenance"; selection category IV "Print Demo"; selection category V "Defaults"; and selection category VI "Language". Selection category II "Original Type" includes: command option 1 "Auto"; command option 2 "Text"; and command option 3 "Photo", which allow the user to input the type of original to be read by the reader. Selection category III "Maintenance" includes command options 1–5 which allow the user to select between five device maintenance functions as labeled in Table 1. Selection category V "Defaults" of the basic operating menu listed in Table 1 includes command options 1–5. The first four command options which include: command option 1 "Feature Defaults"; command option 2 "Program Time-out"; command option 3 "Sleep Mode"; and command option 4 "Paper Size" have two settings. The "Program Time-out", "Sleep Mode", and "Paper Size" command options have a default setting indicated by the * symbol in Table 1. Selection category VI "Language" of the "Copier" mode listed in Table 1, includes command options 1–5 which allow the user to select the language used for displaying information on display 24 including the options of the operating menu.

The "Facsimile" mode of the basic operating menu listed in Table 1 includes substantially the same selection categories as the "Copier" mode of the basic menu. However, the "Facsimile" mode of the basic operating menu also includes selection category III "Telephone Numbers" comprising command options 1–8. This feature of the basic menu allows the user to automatically dial from up to, for example, eight telephone numbers stored in the memory 22 of the device 12. The features of the basic command menu listed in Table 1 are merely examples of the type of features which may be available in the basic operating menu of the device 12. In alternate embodiments, the basic operating menu of the image transfer device may include more features or fewer features depending on device characteristics such as available memory space, capabilities of the CPU and size and type of the display. In other alternate embodiments, the structure of the basic operating menu of the device need not be as shown in Table 1, but rather any suitable organization of the basic operating menu features may be employed.

The CPU 20 displays the selection categories and command options of the basic operating menu listed in Table 1, as command buttons 52 on touch display 50 of the device 12. The command buttons 52 on the touch display 50 have indicia to indicate the selection category or command option corresponding to respective buttons 52. The command buttons corresponding to default settings of the operating menu (see Table 1) may appear when initially displayed in a manner to indicate to the user that the corresponding command options are default options. In the preferred embodiment, the selection categories of the basic operating menu (i.e. categories I–VI in Table 1) are generally displayed first. The command options within each category are hidden when the selection categories of the operating menu are displayed. To display the command options, if any, of a desired selection category on the display 50, the user touches the corresponding command button 52. The CPU 20 then changes the display 50 to show command buttons which represent the command options included in the selected category of the operating menu. In alternate embodiments, the structure of the basic operating menu may be displayed in any suitable manner such as displaying one or more selection categories and their command options at the same time.

Figure 3:
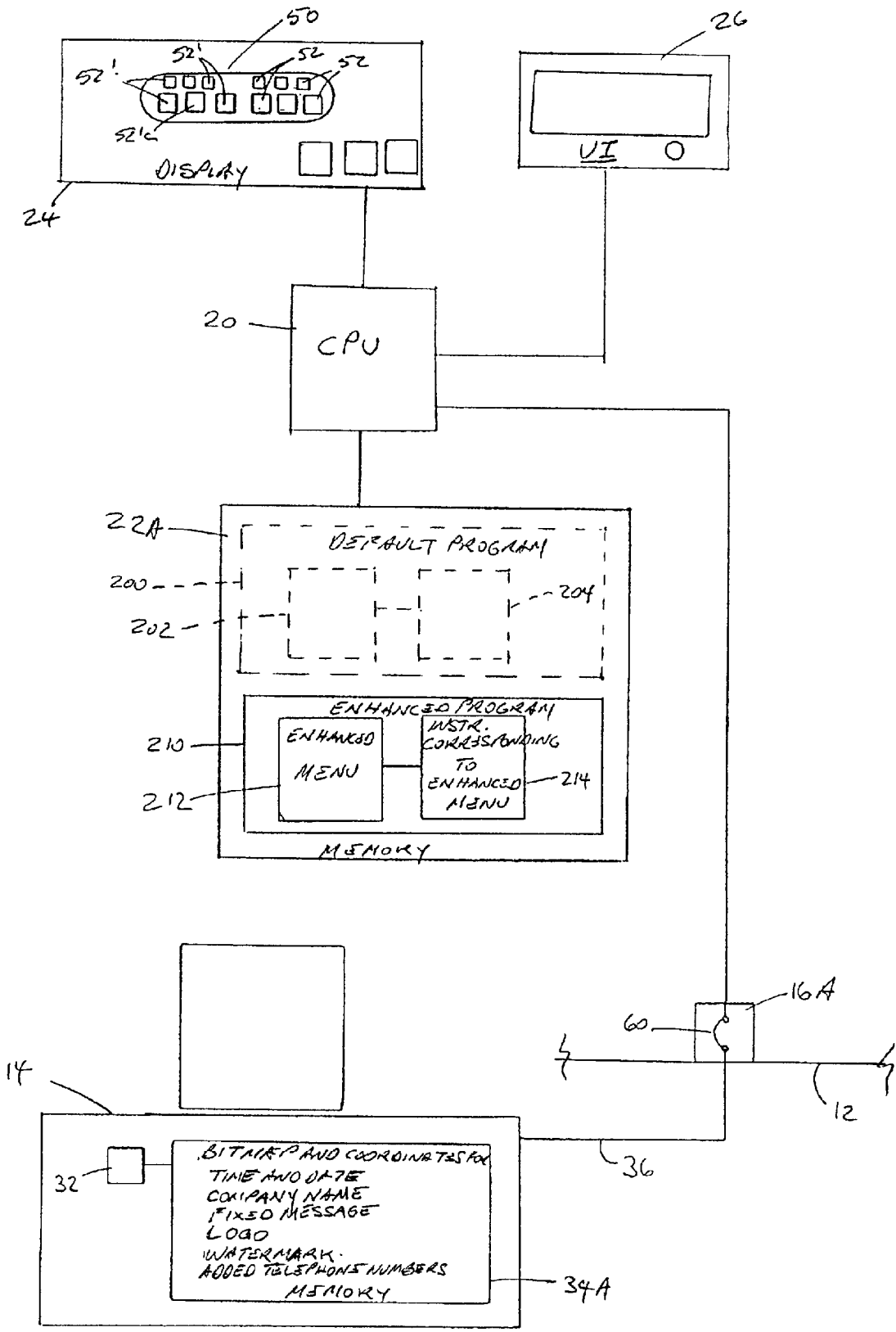
FIG. 3 is a schematic diagram of the computer, and the display, user interface, processor, and memory of the image transfer device of the system shown in FIG. 1, in accordance with one embodiment of the present invention.

Referring now to FIGS. 1 and 3, in accordance with one embodiment of the present invention, an enhanced program 210 for operating the image transfer device 12 is stored in the memory 22 of the device. (Similar reference numbers are used in FIGS. 1, 3, 5 and 7 to designate similar features.) The enhanced program 210 includes a program 212 which defines an enhanced operating menu to be displayed by the CPU 20 on the touch portion 50 of the device display 24.

Similarly to the default program 200, the enhanced program 210 also includes a program module 214 embodying instructions for the CPU 20 to control the functions of the image transfer device 12 corresponding to the commands within the enhanced operating menu in program module 212. As will be described in greater detail below, the enhanced program 210 is available for loading in the CPU 20 when the computer 14 is energized and connected via cable 36 to the connector 16A of the device 12. When the cable 36 is not connected to connector 16A, or the computer 14 is not energized, the enhanced program 210 stored in the memory 22A cannot be accessed or loaded in the CPU 20 of the device 12. Thus, the enhanced operating menu defined by program module 212 is available to be displayed by the CPU 20 on the display 50 of the device 12 when the computer 14 is energized and connected to the device 12. Otherwise, the basic operating menu in program module 202 of the default program 200 is available for display by the CPU 20.

In this embodiment, the connector 16A includes an electromechanical relay 60 or other suitable switching device. The relay 60 is adapted to be moved to the closed position, shown in FIG. 3, when the computer cable 36 is mated to the connector 16A and the computer 14 is energized. Otherwise, the relay 60 in the connector 16A of the device 12 is in an open position (not shown). When the relay 60 is in the closed position, the CPU 20 becomes enabled to access and load the enhanced program 210 stored in the memory 22A of the device 12 thus making the enhanced operating menu in program module 212 available for display.

Figure 4:
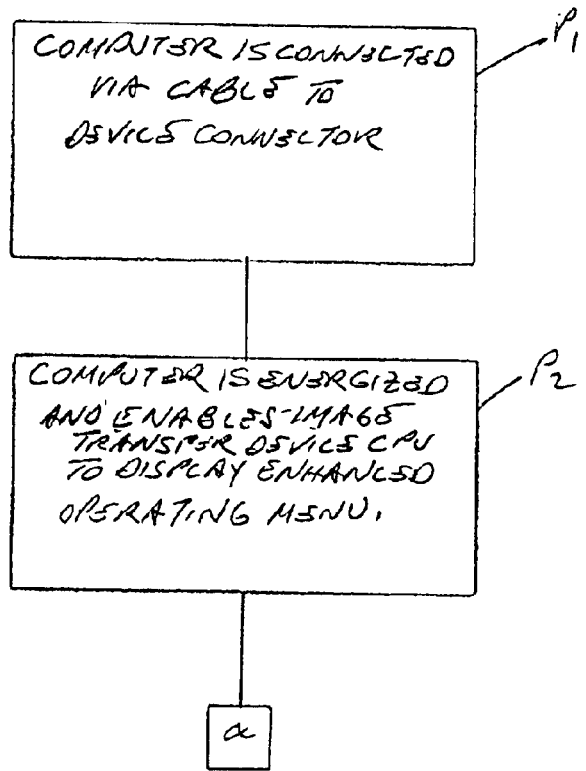
FIGS. 4–4A are flow charts which graphically illustrate a first method in accordance with the present invention for providing the image transfer device with an enhanced operating menu.
Figure 4A:
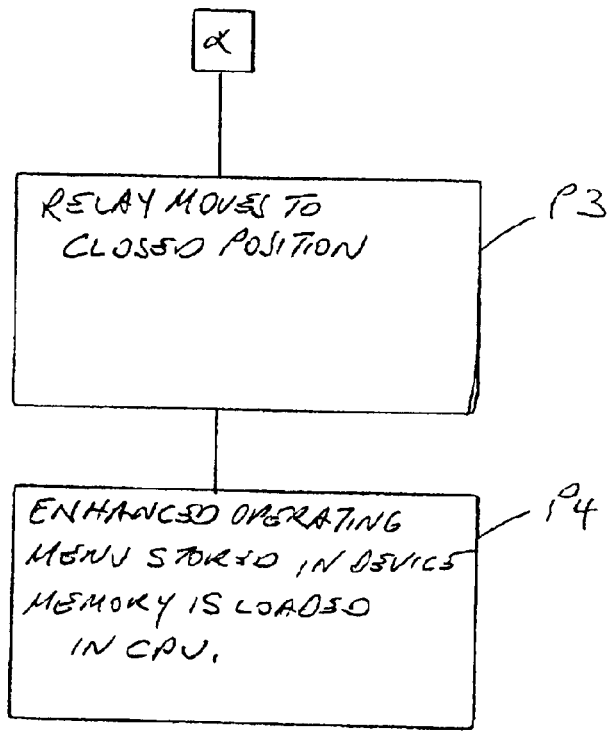

FIG. 4 is a flow chart which graphically illustrates the method for providing the device 12 with the enhanced operating menu. In block P1 of the flow chart in FIG. 4, the computer cable 36 is connected to the connector 16A of the device 12. In block P2, the computer 14 is energized. This enables the CPU 20 of the device 12 to display the enhanced operating menu on the display 50 of the device as illustrated in the flow chart of FIG. 4A. The starting condition in the flow chart of FIG. 4A, represented by α, is that the computer 14 is connected via cable 36 to the device 12 and the computer 14 is energized. As stated earlier, the relay 60 in the connector 16A (see FIG. 3) moves to the closed position, block P3 of FIG. 4A, when the computer cable 36 is connected to the connector 16A and the computer is energized. The closing of the relay 16 enables the CPU 20 to now access and load the enhanced program 212 stored in the memory 22A of the device. Thus, in block P4 of FIG. 4A, the enhanced program 210 which includes program module 212 for displaying the enhanced operating menu is loaded in the CPU 20. Preferably, the CPU 20 has a loading program which automatically loads the enhanced program 210 from the memory 22A when the relay 60 is closed. Alternatively, after the relay is closed, the user may instruct the CPU via the user interface of the device to load the enhanced program from the memory module. After the enhanced program is loaded in the CPU 20, the enhanced operating menu defined by program module 212 is then available to be displayed on touch display 50 of the device 12. In the preferred embodiment, the user may select via a button on the touch display 50 or the user interface 26 whether the enhanced menu or the basic menu is to be displayed, though in alternate embodiments, the enhanced menu may be automatically displayed thereby replacing the basic menu on the display. Program module 214 included in the enhanced program 210 loaded in the CPU 20 provides program instructions to the CPU 20 so that the CPU is now capable of operating the device 12 according to the features of the enhanced operating menu.

One example of the features of the enhanced operating menu are listed in the Table 2 below.

TABLE 2

| | | I. Mode | | |
|---|---|---|---|---|
| | | 1. COPIER | | |
| | | II. ORIGINAL TYPE | | |
| 1. AUTO* | 2. TEXT | 3. PHOTO | | |
| | | III. MAINTENANCE | | |
| 1. CLEAN PRINT HEAD | 2. PRINT TEST PAGE | 3. ALIGN PRINT HEAD | 4. RESET PRINTER | 5. INK LEVELS A. Black B. Cyan C. Magenta D. Yellow |
| | | IV. PRINT DEMO | | |
| | | V. DEFAULTS | | |
| 1. Feature Defaults A. Some new B. Reset | 2. Program Time-out A. 60 sec.* B. 90 sec. | 3. Sleep Mode A. 5 min* B. 10 min | 4. Paper Size A. Latter* B. AA | 5. Reset Factory |
| | | VI. LANGUAGE | | |
| Language 1 | Language 2 | Language 3 | Language 4 | Language 5 |
| | | VII. COLLATION | | |
| | | VIII. TIME & DATE STAMP | | |
| | | IX. COMPANY NAME | | |
| | | X. FIXED MESSAGE | | |
| | | XI. LOGO | | |
| | | XII. PAGE NUMBERING | | |
| | | XIII. WATERMARK | | |
| | | 2. FACSMILE | | |
| | | II. ORIGINAL TYPE | | |
| 1. AUTO* | 2.TEXT | 3. PHOTO | | |
| | | III. TELEPHONE NUMBERS | | |
| NO. 1 NO. 4 | NO. 2 NO. 5 | NO. 3 NO.6 | NO. 4 NO. 7 | NO. 5 NO. 8 |
| | | V. DEFAULTS | | |
| 1. Feature Defaults A. Some new B. Reset | 2. AUTO REDIAL A. 3 min* B. 5 min | 2. Program Time-out A. 60 sec.* B. 90 sec. | 3. Sleep Mode A. 5 min* B. 10 min | 4. Paper Size A. Latter* B. AA |
| | | VI. LANGUAGE | | |
| Language 1 | Language 2 | Language 3 | Language 4 | Language 5 |
| | | VII. COLLATION | | |
| | | VIII. TIME & DATE STAMP | | |
| | | IX. COMPANY NAME | | |
| | | X. FIXED MESSAGE | | |

TABLE 2-continued

| I. Mode |
| --- |
| XI. LOGO |
| XII. PAGE NUMBERING |
| XIII. WATERMARK |

The features of the enhanced operating menu listed in Table 2 are exemplary of the type of features which may be otherwise available to an image transfer device. In alternate embodiments, the enhanced operating menu of the device may include a greater or a fewer number of features than those listed in Table 2. As can be seen from Table 2, the enhanced operating menu of the image transfer device 12 of the present invention has extended features which are not included in the basic operating menu listed in Table 1. In this case, the enhanced menu also includes generally all the features of the basic operating menu, though in alternate embodiments, the enhanced menu include only some of the features in the basic operating menu of the device. The extended features of the enhanced operating menu include: selection category VII "Collation"; selection category VIII "Time & Date" stamp; selection category IX "Company Name"; selection category X "Fixed Message"; selection category XI "Logo"; selection category XII "Page numbering"; and selection category XIII "Watermark". Also, the number of programmable telephone numbers has been expanded in comparison to the basic operating menu in Table 1. The enhanced operating menu may further include a printer and a scanner operating mode not shown in Table 2. Referring still to FIGS. 1 and 3, the extended selection categories of the enhanced operating menu appear on the device display 50 as command buttons 52'. Command buttons 52 in the display 50 continue to represent the selection categories of the basic operating menu which are repeated in the enhanced menu being displayed.

In this embodiment of the present invention, some data used to effect image transfer with device 12 according to the enhanced menu features is stored in the memory 34A of the computer 14. By way of example, such data may include bitmaps representing time and date stamps, fixed messages, logos or watermarks to the added to the images as well as the coordinates for printing the bitmaps on sheet medium 102 (see FIG. 1). In addition, telephone numbers in excess of the number provided with the basic operating menu may also be stored in the computer memory 34A.

Figure 9:
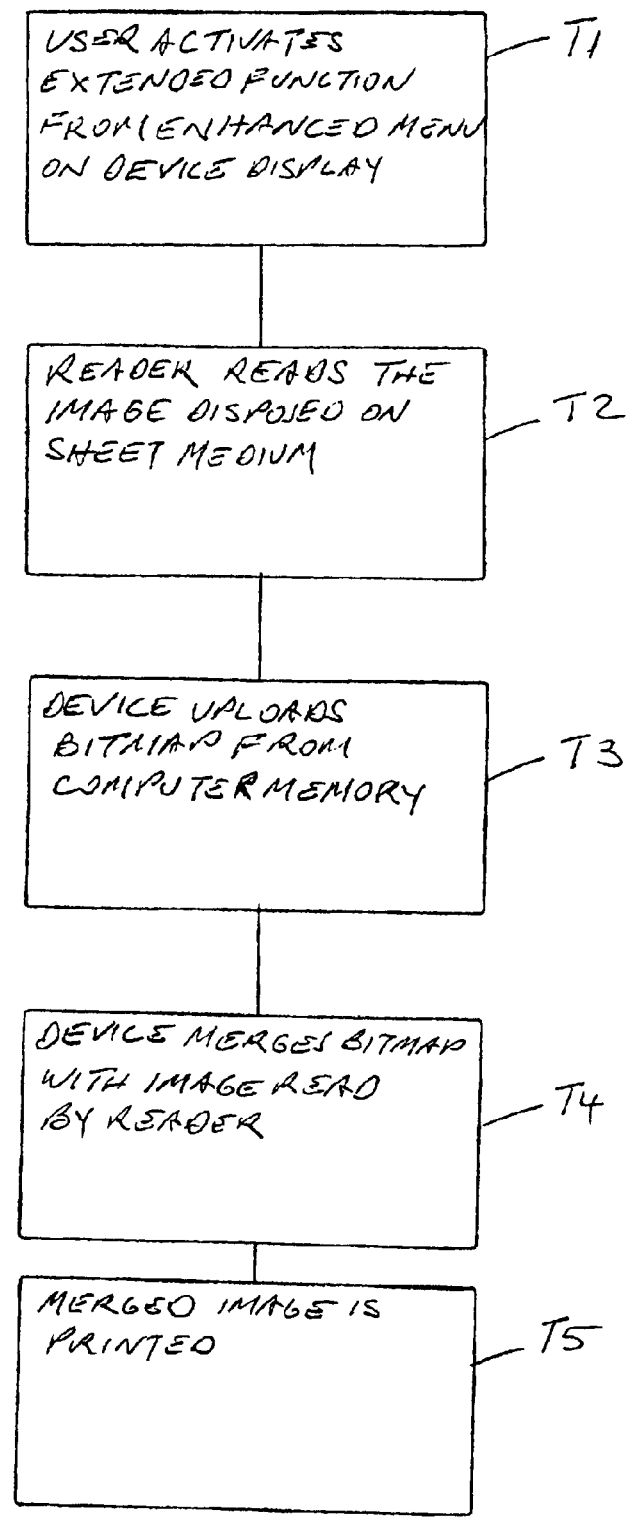
FIG. 9 is a flow chart which illustrates an image transfer procedure performed with the image transfer system shown in FIG. 1 in accordance with the present invention.

When an image transfer is to be performed according to an extended function of the device 12, the CPU 20 interfaces with the computer 14 to upload the corresponding data from the computer memory 34A. This process is illustrated in the flow chart shown in FIG. 9. First, in block T1, the user selects the desired features an initializes the device 12 from the enhanced operating menu on display 50. For example, in the case where the copier mode of the device 12 is selected and the user wishes to add a fixed message, such as "Confidential Document", to the copied image, the user touches the appropriate command button 52'C (see FIG. 3) representing the "Fixed Message" feature (selection category X in Table 2) of the enhanced operating menu. In block T2 of FIG. 9, the reader 18 (see also FIG. 1) reads the image on sheet medium 100. Activation of the command button 52'C causes the CPU 20 of the device 12 to upload the bitmap for the message (e.g. "Confidential Document") stored in the computer memory 34A, block T3 of FIG. 9. The CPU 20 also uploads from the computer memory 34A the coordinate data indicating where the message is to be printed on sheet medium 102. The CPU 20 then, in block T4, merges the bitmap with the image data from the reader 18 of the device 12 such that the image printed by the print head 28 on the sheet medium 102, block T5 of FIG. 9, includes the message "Confidential Document" in the desired location. A similar method may be used to add the time and date stamp, a company name, a logo or a watermark to images being transferred from the reader 18 to the print head 28 of the image transfer device 12. Bitmaps may also be added in a substantially similar manner to images received by the communication device 30 (see FIG. 1) over communication line 302 which are to be printed by the device 12. Preferably, the uploaded information stays with the device 12 even if the computer is de-energized or is disconnected from the connector 16.

Figure 5:
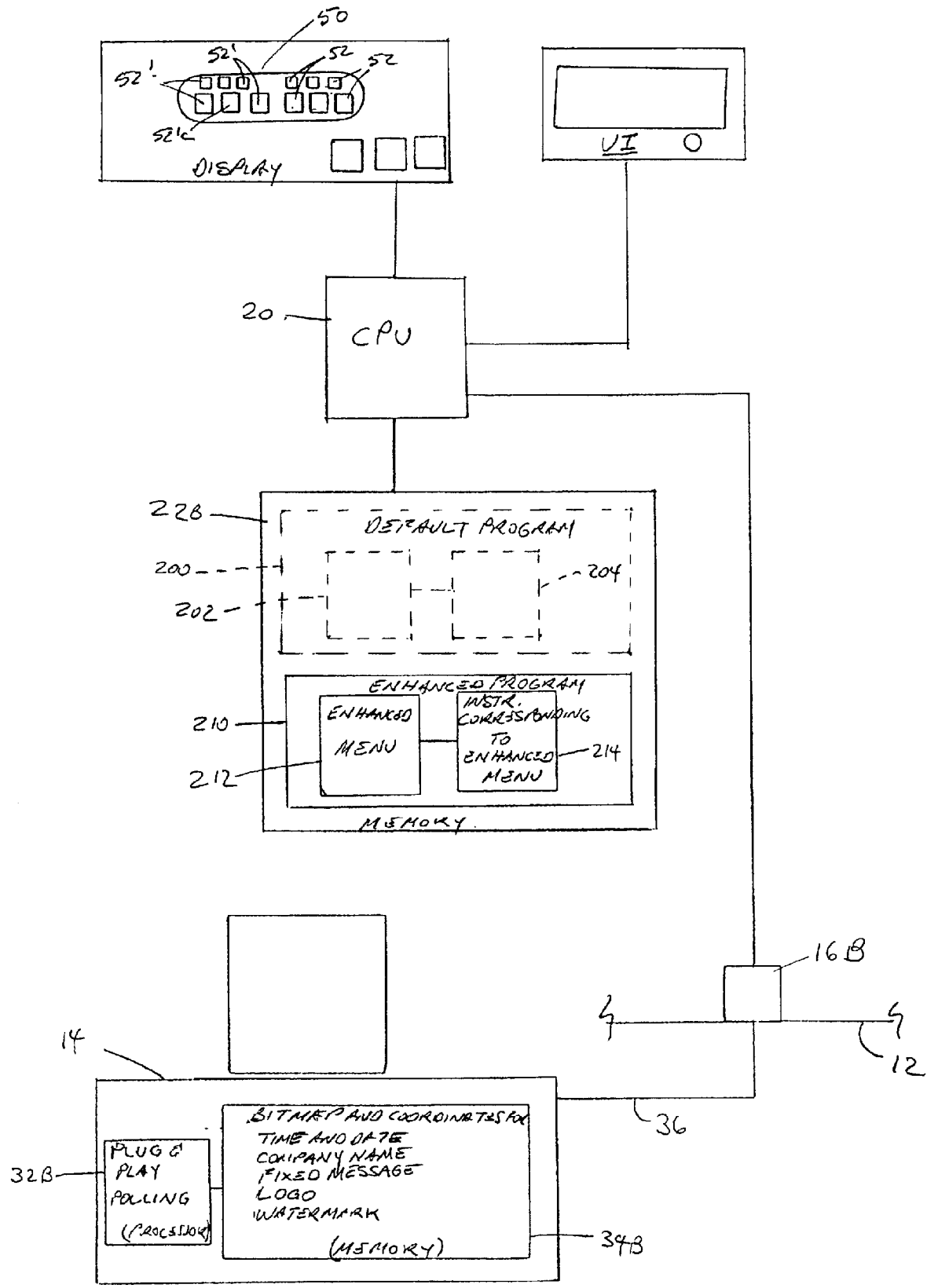
FIG. 5 is a schematic diagram of the computer, and the display, user interface, processor, and memory of the image transfer device of the system shown in FIG. 1, in accordance with a second embodiment of the present invention.
Figure 6:
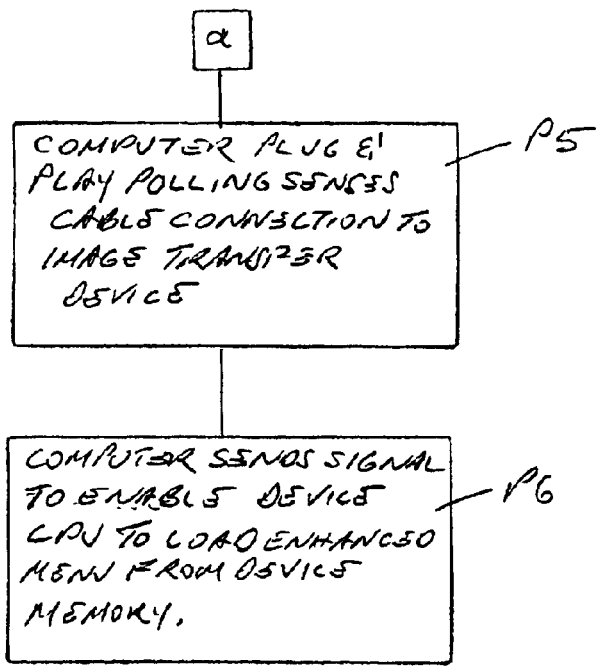
FIG. 6 is a flow chart which illustrates a second method in accordance with the present invention for providing the image transfer device with an enhanced operating menu.

Referring now to FIGS. 1 and 5, in accordance with a second embodiment of the present invention, the computer 14 of the image transfer system 10 has a processor 32B which is programmed to have a "Plug and Play" polling capability. "Plug and Play" polling allows the computer processor 32B to sense, by means of a polling signal, when the computer 14 is connected to the image transfer device 12 of the image transfer system. In this embodiment, the connector 16B of the device 12 need not include a relay to signal the device CPU 20 that the computer 14 is connected to the device 12. Rather, as illustrated in the flow chart of FIG. 6, in this embodiment when the computer processor 32B senses that the computer 14 is connected via cable 36 to the connector 16B of the device 12, block P5, the processor 32B sends an electronic signal to the device CPU 20, block P6. The electronic signal enables the CPU 20 to load the enhanced program 212 from the memory 22B of the device 12. For example, the CPU 20 may be programmed such that upon receiving the electronic signal from the computer 14, the CPU 20 is to initiate its loading program and load the enhanced program 210 from the device memory 22B. The CPU 20 does not load the enhanced program 210 until it receives the electronic signal from the computer 14. Alternatively, the computer processor 32B may be programmed to incorporate instructions in the electronic signal sent to the CPU 20, upon connection of the cable 36 to the device connector 16B, which instructions program the CPU 20 to load the enhanced program 210 from the device memory 22B. After the enhanced program 210 is loaded in the CPU 20, the enhanced operating menu in program module 212 is available for display on display 50 as described previously.

Figure 8:
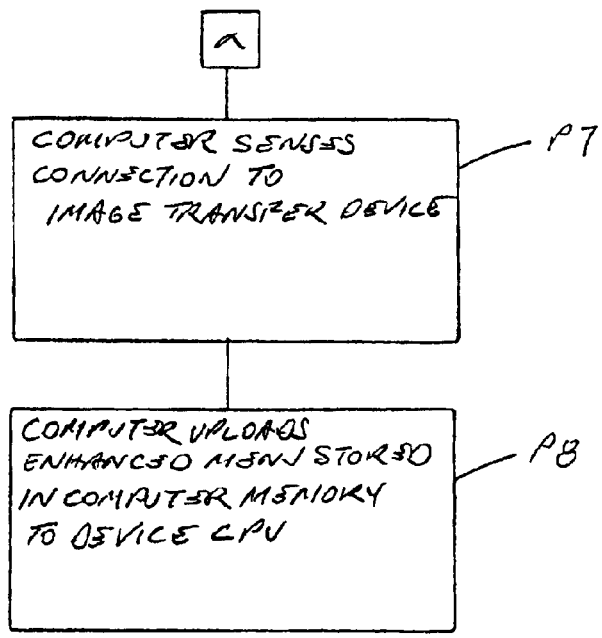
FIG. 8 is a flow chart which illustrates a third method in accordance with the present invention for providing the image transfer device with an enhanced operating menu.
Figure 7:
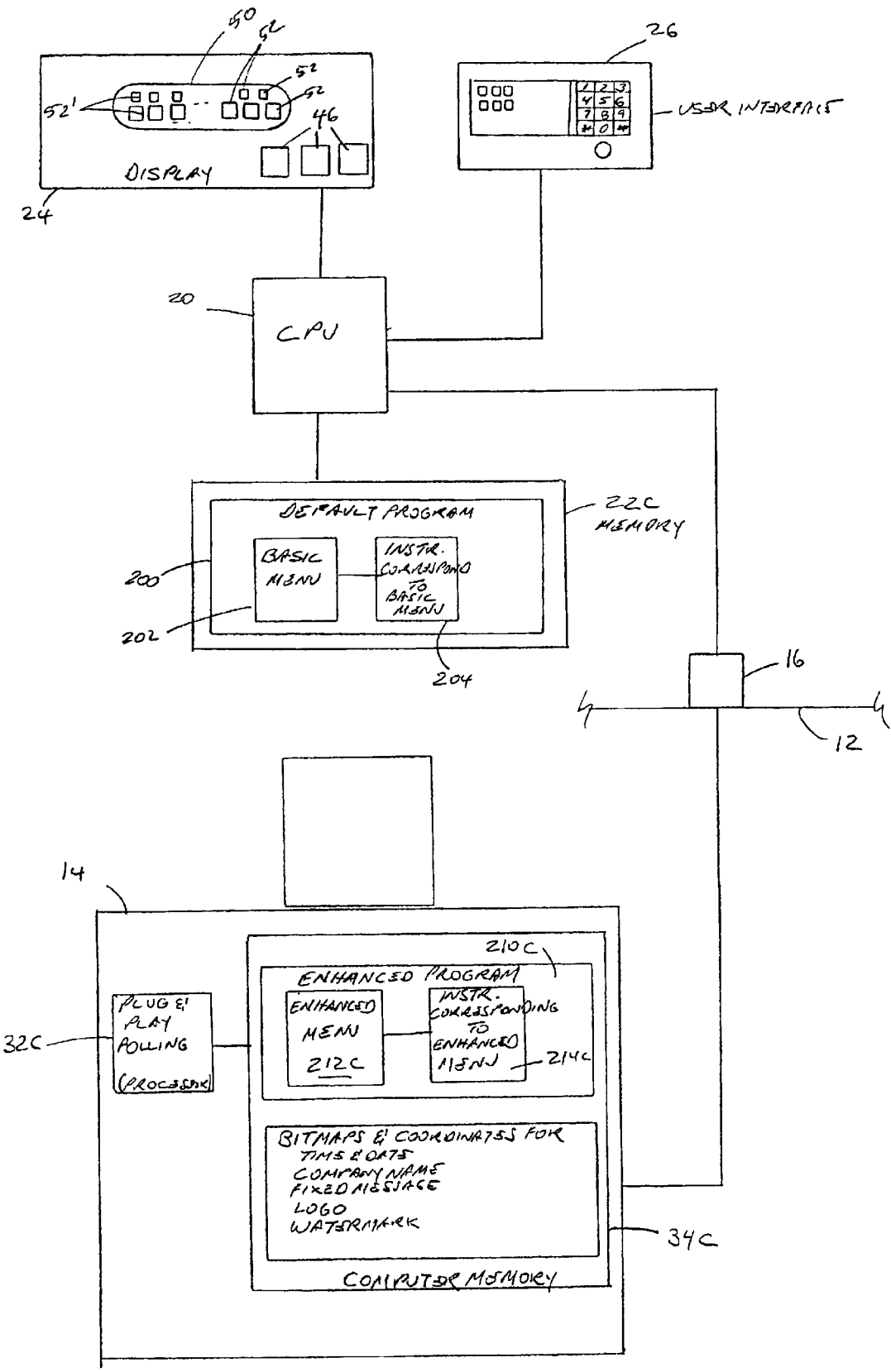
FIG. 7 is a schematic diagram of the computer, and the display, user interface, processor, and memory of the image transfer device of the system shown in FIG. 1, in accordance with a third embodiment of the present invention.

FIG. 7 shows a schematic diagram of the computer 14 and the CPU 20, memory 22C, user interface 26, and display 24 of the image transfer device 12 in accordance with a third embodiment of the present invention. In this embodiment, the enhanced program 210C for operating the image transfer device 12 is stored in the computer memory 34C. The enhanced program 210C includes the module 212 for displaying the enhanced menu on the display 50 and the module 214 with program instruction for operating the device 12. The default program 200 embodying the basic operating menu of the device (program module 202) is stored in the memory 22C of the device 12. As with the previously described embodiments of the present invention, the default program, and hence, the basic menu is loaded in the CPU 20 of the device 12 when the computer 14 is not connected to the device connector 16C. The method in which the enhanced operating menu is made available for display on the display 50 of the device 12 is graphically illustrated in the flow chart of FIG. 8. In this embodiment, the computer processor 32C has the "Plug and Play" polling capability, and thus, in block P7 of FIG. 8, the computer processor senses when the computer is connected to the device 12. Afterwards, in block P8 the processor 32C uploads the enhanced program 210C, including the module 212 with the enhanced operating menu, to the CPU 20 of the device 12. This enables the CPU 20 to display the enhanced operating menu stored in the computer memory 34C on the display 50 of the device 12. The enhanced operating menu in program module 212 available for display on display 50 has substantially the same features as listed in Table 2.

The program instructions in program module 214 for operating the device 12 in accordance with the extended image transfer command options of the enhanced operating menu are also uploaded, at least in part, by the computer processor 32C to the device CPU 20. In this embodiment, the device CPU 20 may use the computer processor 32C, and memory 34C to effect some of the extended image transfer functions in the enhanced operating menu listed in Table 2. The CPU 20 may effect one or more of the extended image transfer command options of the enhanced operating menu of the image transfer device 12 using the following procedure. The reader 18 (see FIG. 1) is operated by the CPU 20 to read an image disposed on sheet medium 100. The CPU 20 then downloads the image data from the reader 18 to the computer processor 32C. In conjunction with this, the CPU 20 preferably also sends a signal to the computer processor 32C indicating which of the extended command options of the enhanced menu is to be performed. By way of example, the user may select from the enhanced menu to operate the device 12 in the copier mode with collation of copies (selection category VII in Table 2), and accordingly touches the appropriate command buttons on the touch display 50. The CPU 20 recognizes activation of these commands and sends a signal to the computer processor 32C indicating that collating function is to be performed. Upon receiving the image data downloaded by the CPU 20, the computer processor 32C automatically manipulates the image data in a manner consistent with effecting the selected image transfer function identified by the signal from the CPU 20. Then, the computer processor 32C automatically sends the now manipulated data back to the device 12 without user interaction. The CPU 20 routes the manipulated data to the print head 28 of the device 12 for printing on sheet medium 102, or to the communication device 30. For example, in the case of the collating function mentioned above, the computer processor 32C automatically stores the series of images read by the reader 18 and then generates sequential copies of the series of images in order to form a collated series of images in electronic form. This step is performed by the processor 32C without user interaction to create the collated images. Then, the computer processor 32C automatically sends each series of images to the print head 28 of the device 12 also without user interaction. Each series of images received by the print head 28 is printed on sheet medium 102 to form printed collated images. In the case where the user chooses from the enhanced menu on display 50 to add a fixed message to printed copies, the computer processor 32C automatically merges the bitmap for the fixed message from the computer memory 34C with the image data downloaded from the reader 18 (see FIG. 1). The computer processor 32C automatically accesses the bitmap from the memory 34C and merges the bitmap with the image data without user interaction. The manipulated data is then automatically sent to the print head 28 without user interaction for printing the image and the fixed message on sheet medium 102.

The present invention provides a stand alone image transfer device equipped with minimal memory and processing capabilities to perform basic image transfer operations, which when connected to a computer such as a PC, can be quickly expanded to have an extended number of advanced function which generally are not available in an image transfer device of that size. The image transfer device in the present invention uses, to its advantage, the larger processing and memory capacity of the computer to carry out image transfer functions which otherwise could not be performed using only the in-built capabilities of the image transfer device.

The multi-function device 12 connectable to the PC 14, can operate, at least partially, as a stand alone device when not connected to the PC. The multi-function device 12 includes a printer, and/or a copier, and/or a facsimile and/or a optical scanner capability. For example, the device 12 may be able to function as a fax machine when not connected to the PC 14, but when connected to the PC it can function as both a fax machine and a computer printer. The PC 14 has the software and the memory which the device 12 uses, at least partially, to perform the new function.

In this invention, the device 12 has internal menu features as a stand alone unit, but when connected to the PC 14 extended menu features are now accessible/visible on the device control panel. The extended features disappear when the device is disconnected from the PC 14. One means for sensing connection and disconnection between the PC 14 and the device 12 is be using a cable 36 with USB (universal serial bus) connectors and "Plug & Play" polling. The internal menu features and possible sub-menu options are listed in Table 1. The list of extended menu features which can appear on the display of the device 12 when it is connected to the PC to become a fax/printer/copier with enhanced copier features is provided in Table 2. The extended menu features are not accessible or even visible on the display of the device when it is not connected to the PC.

The computer 14 has software to send instruction script to the device 12 when they are connected to each other to display the extended menu features, and software and memory of the PC to help execute those extended features. This invention provides the advantage of the device having internal minimal memory and menu displays to reduce the cost of the device, but uses or borrows the software and memory of the PC (without the user really knowing it, but he could) and add new user selectable/accessible/viewable menu functions to the control panel display 50 of the device 12. In addition the PC 14 uploads a bitmap, such as a logo, an extra menu selection display feature for the bitmap, and coordinates for printing the bitmap on the paper. The upload would stay with the device 12 even if the PC 14 is disconnected from the device. This provides the advantage of faster printing of the indicia because the device 12 does not have to go back to the PC 14 for the indicia each time it is to be printed. Further variations of the indicia could be at the PC 14 and accessible by the menu display at the device 12 when the device is connected to the PC. Thus, when connected to the PC the user could select different variations of indicia such as selecting "Attorney—Client Privilege" (indicia 2) rather than "CONFIDENTIAL DOCUMENT" (indicia 1).

In this invention the extra menu functions can be stored in the device and merely enabled for viewing on the display 50 of the device 12 when connected to the PC 14. When not connected to the PC, the extra menu display of the features would still be in the memory of the device, but not accessible/viewable by the user (because they would not be able to be selected for use without connection to the PC).

There is insufficient memory in the multifunction device to perform extended functions such as collation, but because the multifunction device 12 in this invention is attached to the PC 14, the user can scan the information of the reader 18, send the scanned data to the PC 14 to do the extended or enriched task, such as collation and reformat the document as a collated set of prints, and send the reformatted data and new instructions bask to the multi-function (MF) device print head 24. Initiation of the job takes place at the device, so the user need not know the PC is involved in the process. That is, the device 12 is "smart" enough to know it has extra capabilities because a PC 14 is attached to it. This involves interaction with new features/functions that become visible/available at the device when, on install, the device CPU 20 software "sees" a PC in the configuration, and those extra capabilities will be available through the touch display 50 on the device. Extended feature buttons are embedded in an LCD UI 50 on the device 12 that are visible and operational when the PC 14 is connected to the device.

One of the significant cost factors in the manufacture of multi-function devices has been the cost of memory. In order to provide the multi-function devices of the prior art with the ability to perform extended functions, such as collating, pagination, or addition of logos or messages, the size of the internal memory was increased with a resultant significant increase in the cost of the devices. To reduce the cost of the devices in the prior art, the internal memory size was cut which limited the capabilities of the low cost devices to performing only basic functions such as mere copying or faxing without any enhancement. In other words, in the prior art low cost meant small memory, and hence, only basic functions. One of the significant advantages of the present invention is that it solves the cost versus features conundrum by borrowing the processing power and memory capacity of a PC 14 to extend and enhance the functions of the multi-function device 12. Thus, the present invention eliminates the need for larger memory in the devices 12, thereby allowing the cost of the devices 12 to remain small in comparison to multi-function devices of the prior art which a capable of performing similar extended or enhanced functions.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. An electronic assembly comprising;
   a first image transfer device for reading and transferring an image from a first medium, the first image transfer device including a reader for reading the image on the first medium, and a display exclusively used by the image transfer device for displaying an image transfer menu for effecting transfer of the image between the first image transfer device and another image transfer device; and
   a computer removably connected, to the first image transfer device;
   wherein when the first image transfer device is not connected to the computer the first image transfer device has a first type of the image transfer menu available for display on the display of the device, and wherein when the first image transfer device is connected to the computer the transfer device has a second type of the image transfer menu available for display on the display of the device wherein a first portion of the second type of the image transfer menu is stored in the computer.

2. An electronic assembly in accordance with claim 1, wherein the first image transfer device is at least one of a copier, a fax machine, or a printer.

3. An electronic assembly in accordance with claim 1, wherein the first image transfer device includes a processor for controlling operation of the device, a memory for storing the first type of the image transfer menu, and a user interface for accessing one of the types of image transfer menu displayed on the display.

4. An electronic assembly in accordance with claim 3, wherein another portion of the second type of the image transfer menu is stored in the memory of the first image transfer device, the processor being programmed to display on the display the first type of the image transfer menu when the computer is not connected to the first image transfer device, and wherein the computer has software for enabling the processor of the device to display the second type of menu on the display of the device when the computer is connected to the first image transfer device.

5. An electronic assembly in accordance with claim 1, wherein the second type of the image transfer menu includes expanded features for operating the image transfer device in comparison to features of the first type of the image transfer menu.

6. An electronic assembly in accordance with claim 1, wherein the first type of the image transfer menu comprises a base set of features including at least one of a feature for selecting a type of original, a feature for selecting device maintenance settings, a feature for selecting device default settings, or a feature for selecting language settings, and wherein the second type of the image transfer menu comprises an expanded set of features, the expanded set of features including at least one of the features from the base set of features, and at least one extra feature not included in the base set of features.

7. An electronic assembly in accordance with claim 6, wherein the image transfer device is a fax machine, and the extra feature is at least one of an extended phone log selection feature, or a delayed transmission selection feature.

8. An electronic assembly in accordance with claim 6, wherein the extra feature is at least one of a feature for collating copies, a feature for adding a logo, a feature for adding a message, a feature for adding page numbering, or a feature for adding a watermark.

9. An electronic assembly in accordance with claim 1, wherein the computer has software for communicating with the reader when the computer is connected to the reader and for receiving data read by the reader, and wherein the computer has software for manipulating the data received from the reader in accordance with a feature of the second type of the image transfer menu.

10. An electronic assembly in accordance with claim 1, wherein the image transfer device is adapted to transfer the image to at least one of the computer connected to the image transfer device, another computer located at first remote site, or a printing device for printing the image on a second medium at a first remote site.

11. An electronic assembly in accordance with claim 1, wherein the computer is adapted for sending a polling signal to determine if to determine if the computer is connected to the image transfer device, and wherein when the polling signal indicates that the computer is connected to the device, the computer uploads the second type of menu to the device.

12. An electronic assembly comprising;
an image transfer device for reading and transferring an image from a first medium, the image transfer device including a reader for reading the image on the first medium, and a display exclusively used by the image transfer device for displaying an image transfer menu for effecting transfer of the image; and
a computer removably connected to the image transfer device;
wherein when the image transfer device is not connected to the computer the image transfer device has a first type of the image transfer menu available for display on the display of the device,
and wherein when the image transfer device is connected to the computer the transfer device has a second type of the image transfer menu available for display on the display of the device,
and wherein at least a portion of the second type of the image transfer menu is stored in the computer.

13. An electronic assembly in accordance with claim 12, wherein the processor is programmed to display on the display the first type of the image transfer menu when the computer is not connected to the image transfer device, and wherein the computer has software for sending information embodying the portion of the second type of the image transfer menu to the processor enabling the processor to display the second type of menu on the display of the device when the computer is connected to the image transfer device.

14. A transfer apparatus having a reader for scanning information disposed on a first medium, and a controller connected to the reader, the transfer apparatus comprising:
a connector connected to the controller for removably connecting a computer to the transfer apparatus; and
a display connected to the controller for displaying menus comprising features for operating the transfer apparatus;
wherein the display displays a first one of the menus when the computer is not connected to the apparatus, and wherein the display displays a second one of the menus when the computer is connected to the apparatus, the second menu comprising at least one feature of the first one of the menus and extended features for operating the apparatus in comparison to the first menu,
and wherein when the computer is connected to the apparatus the controller receives instructions from the computer that program the controller to load the second one of the menus.

15. A transfer apparatus in accordance with claim 14, wherein the apparatus further comprises a memory for storing the first menu, and wherein the controller is programmed to display the first menu on the display of the apparatus when the computer is not connected to the apparatus.

16. A transfer apparatus in accordance with claim 15, wherein the second menu is stored in the memory of the apparatus, and wherein the controller receives instructions from the computer enabling the controller to display the second menu on the display of the apparatus when the computer is connected to the apparatus.

17. A transfer apparatus in accordance with claim 14, wherein the controller receives instructions from the computer embodying at least a portion of the second menu stored in the computer, and wherein the instructions received from the computer enable the controller to display the second menu on the display of the apparatus when the computer is connected to the apparatus.

18. A transfer apparatus in accordance with claim 14, wherein the first menu has a predetermined number of features for operating the apparatus, and wherein the extended features of the second menu include at least one of the features from the first menu, and at least one extra feature not included in the first menu.

19. A method for transferring information from a first medium, the method comprising the steps of:
providing an image transfer device having a scanner for reading an image on the first medium;
reading the image on the first medium with the scanner;
automatically uploading electronic data including at least a portion of an image transfer menu to be displayed by the image transfer device to the transfer device from a computer connected to the transfer device;
with a processor of the image transfer device, automatically merging the electronic data with the image read by the scanner; and
transferring the merged image by the transfer device to a second medium.

20. A method in accordance with claim 19, wherein the electronic data uploaded from the computer to the image transfer device stays with the image transfer device after the computer is disconnected from the image transfer device.

21. A method for enhancing operating features of a transfer device for transferring information from a first medium to a second medium, the method comprising the steps of:
providing a first command menu stored in a memory of the transfer device, the first command menu representing a first set of the operating features of the device, the first menu being available for display on a display of the device;
connecting a computer to the transfer device; and
with the computer, enabling the device to display a second command menu when the computer is connected to the device, the second command menu representing a second set of the operating features of the device, wherein the second set of operating features has at least one feature of the first set of operating features and expanded operating features in comparison to the first set of operating features of the device, and wherein a portion of the second command menu is stored on the computer.

22. A method in accordance with claim 21, further comprising the step of storing the second menu in the memory of the transfer device.

23. A method in accordance with claim 21, wherein the first menu has commands corresponding to the operating features in the first set of operating features, the first menu commands including at least one of a command for selecting a type of original, for selecting device maintenance settings, for selecting device default settings, or for selecting a display language setting.

24. A method in accordance with claim 21, wherein the second set the operating features includes at least one of the operating features in the first set of the operating features, and wherein the second set of the operating features further includes at least one of an extended phone log feature, a delayed transmission selection feature, a collating feature, a message addition feature, a logo addition feature, a page numbering feature, or a watermark addition feature.

25. A method for enhancing operating features of a transfer device for transferring information from a first medium to a second medium, the method comprising:
providing a first command menu stored in a memory of the transfer device, the first command menu representing a first set of the operating features of the device, the first menu being available for display on a display of the device connecting a computer to the transfer device; and with the computer, sending instructions that program the device enabling the device to load and display a second command menu when the computer is connected to the device, the second command menu representing a second set of the operating features of the device, wherein the second set of operating features has expanded operating features in comparison to the first set of operating features of the device, and wherein at least a portion of the second menu is stored in a memory of the computer.

26. A method in accordance with claim 25, where in the step of enabling comprises sending information from the computer to the device, which information embodies the portion of the second menu stored in the computer.

* * * * *